(12) United States Patent
Orlando et al.

(10) Patent No.: US 8,763,714 B2
(45) Date of Patent: Jul. 1, 2014

(54) AGRICULTURAL TRACTION SYSTEM WITH CABLE AND HOISTS

(76) Inventors: Romano Orlando, Rome (IT); Andrea Zoffoli, Rome (IT)

(*) Notice: Subject to any disclaimer, the term of this patent is extended or adjusted under 35 U.S.C. 154(b) by 0 days.

(21) Appl. No.: 13/390,071

(22) PCT Filed: Aug. 4, 2010

(86) PCT No.: PCT/IT2010/000353
§ 371 (c)(1),
(2), (4) Date: Apr. 5, 2012

(87) PCT Pub. No.: WO2011/018813
PCT Pub. Date: Feb. 17, 2011

(65) Prior Publication Data
US 2012/0186213 A1    Jul. 26, 2012

(30) Foreign Application Priority Data
Aug. 12, 2009    (IT) ................................ RM09A0437

(51) Int. Cl.
*A01B 3/64*    (2006.01)

(52) U.S. Cl.
USPC ................................ 172/23; 701/50; 212/344

(58) Field of Classification Search
USPC ........ 212/344, 276, 270; 701/41, 50, 44, 300; 340/988; 56/14.9, 13.5; 172/490, 23, 172/213; 254/327, 362
See application file for complete search history.

(56) References Cited

U.S. PATENT DOCUMENTS

| | | | | |
|---|---|---|---|---|
| 509,556 A | * | 11/1893 | Roberts | 172/23 |
| 1,367,127 A | | 2/1921 | Culbertson | |
| 1,503,467 A | * | 8/1924 | Bertella | 172/23 |
| 1,670,734 A | * | 5/1928 | Moore | 254/285 |

(Continued)

FOREIGN PATENT DOCUMENTS

| | | |
|---|---|---|
| FR | 520452 | 7/1920 |
| FR | 52671 E | 5/1945 |
| WO | WO 95/31759 | 11/1995 |

OTHER PUBLICATIONS

International Search Report issued in PCT Application No. PCT/IT2010/000353, dated Aug. 4, 2010.

(Continued)

*Primary Examiner* — Árpád Fábián-Kovács
(74) *Attorney, Agent, or Firm* — Hershkovitz & Associates, PLLC; Abraham Hershkovitz

(57) ABSTRACT

An agricultural traction system having a) two agricultural machineries, respectively one left-handed machinery and one right-handed machinery, each machinery having a rectilinear frame having four corners, four wheels, each attached to one of the four corners of the rectilinear frame, a driving and reversible control unit mounted on the frame between two adjacent wheels of the four wheels, a hoist connected to the frame and provided with a safety clutch, jacks arranged on one side of the frame and configured to steady the machinery, counterweights, arranged on another side of the frame, opposite to the side of the frame on which the jacks are arranged, and means, provided inside the control unit, for independent and remote automatic driving, b) a cable configured to wind and unwind around respective hoists of the two machineries, c) an agricultural tool that moves along the cable as the cable winds and unwinds around the hoists; and d) a telescopic arm attached to the agricultural tool and configured to extend the cable during movement of the agricultural tool along the cable.

9 Claims, 19 Drawing Sheets

(56) References Cited

U.S. PATENT DOCUMENTS

| | | | | |
|---|---|---|---|---|
| 1,717,209 A | * | 6/1929 | Hester | 172/490 |
| 1,733,242 A | * | 10/1929 | Semenza et al. | 191/12 R |
| 1,908,556 A | * | 5/1933 | Rigondeau | 254/327 |
| 3,186,493 A | * | 6/1965 | Barry | 172/26 |
| 3,601,200 A | * | 8/1971 | Peterson | 172/23 |
| 4,369,590 A | * | 1/1983 | Miller | 37/231 |
| 5,074,105 A | * | 12/1991 | Roth | 56/8 |
| 5,189,867 A | * | 3/1993 | Schmidt | 56/8 |
| 5,511,366 A | * | 4/1996 | Roth | 56/8 |
| 5,923,270 A | * | 7/1999 | Sampo et al. | 340/988 |
| 6,073,070 A | * | 6/2000 | Diekhans | 701/50 |
| 6,393,812 B1 | * | 5/2002 | Stewart et al. | 56/9 |
| 6,647,704 B2 | * | 11/2003 | Penny et al. | 56/8 |
| 6,732,499 B2 | * | 5/2004 | Morgan et al. | 56/9 |
| 7,032,763 B1 | * | 4/2006 | Zakula et al. | 212/344 |
| 7,344,037 B1 | * | 3/2008 | Zakula et al. | 212/344 |
| 7,690,520 B2 | * | 4/2010 | Zakula et al. | 212/344 |
| 8,055,554 B2 | * | 11/2011 | Zakula et al. | 705/28 |
| 2006/0161318 A1 | * | 7/2006 | Aldred et al. | 701/23 |
| 2007/0130902 A1 | * | 6/2007 | Murawski | 56/14.9 |

OTHER PUBLICATIONS

English Translation of FR 520,452 above.

* cited by examiner

101

105

106

107 ions. An example of said technology is the machine manu-
AGRICULTURAL TRACTION SYSTEM WITH CABLE AND HOISTS

BACKGROUND OF THE INVENTION (1) Field of the Invention

The present invention relates to an agricultural traction system and method.

More specifically, the invention concerns a system of the above kind comprising two machineries; each one specifically studied and realised so as to permit exploiting at best peculiarities of the technology employing agricultural traction machines.

(2) Description of the Related Art

Traction plowing is known at least since the end of 19th century.

Observing collateral phenomenons connected with modern agricultural techniques, always more jeopardizing the ecosystem of agricultural ground, applicants have understood that application of funicular traction plowing could solve many of the problems connected with modern agriculture.

Particularly, it has been observed that elements contributing more to the decaying of ground soil structure are repeated passage on the ground with heavy machines, causing compaction of underlying ground structure, destroying bacterial micro fauna, essential to the ground life, thus modifying its hydrologic features.

As already mentioned, it is known that agricultural tools (such as plows, harrows, seeders, manure spreaders, sprayers, ecc.) employed for working ground have been, during a set historical period (from about 1850 to about 1940) operated by traction systems.

The above technology started developing after vapour power had been developed, and continued up to when combustion traction machineries have been available having sufficient power to move them, also taking into consideration the weight necessary to ensure sufficient adhesion on the ground, and at the same time towing the above agricultural tools.

Abandonment of the above technology coincides with growing of wheel power available on modern traction machineries, and with new tyres, by which the latter have been successfully employed, abandoning funicular traction systems.

As to the funicular traction, its main applications have been developed employing vapour propulsion funicular traction machines (also known as "fables").

Some indications of their use are still available in funicular traction systems in Italy since 1890 (Conte Eng. De Asarta at Fraforeano, Barone Traves di Boinfigli, Verona, Doct. Cattadori, Piacenza). In this case, they were spiral systems, i.e. systems with a rope surrounding the field. In other words, old Howard apparatuses have been used, with a drum hoist, e.g. manufactured by Violati Tescari at Ariano Polesine that, with a prototype realised during 1913, was present at the Monocoltura contest at Parma.

The next generation employed Fowler technology, based on providing two opposite hoists on a headland of ground to be cultivated.

As of 1914, the attention of manufacturers has been always more based on the latter systems, since they improved mechanical efficiency with respect to the previous generations. An example of said technology is the machine manufactured by the Brioschi company on behalf of Imprese Elettriche, Milan, Italy.

The main problem with the above technology is connected with the type of propulsion, and particularly its heavy weight with respect to the power available and outer difficulties during displacements.

BRIEF SUMMARY OF THE INVENTION

On the basis of the above, Applicants have realised technical solutions permitting a positive and innovative application of cable traction plowing technology, exploiting its positive peculiarities.

The main object of the present invention is that of providing a technical solution by introducing electric propulsion in cable traction plowing, in order to avoid all the above mentioned technical problems.

Another object of the present invention is that of providing a solution permitting satisfying CHG emission requirements provided by the Kyoto 2 protocol, as well as almost total reduction of noise, causing alteration of natural environment equilibrium.

A further object of the present invention is that of providing a solution that can drastically modify traditional earth-man anthropologic relationships, usually based on physical fatigue.

A further object of the present invention is that of providing a solution maintaining the feature of not degrading the physical structure of the ground during its working by repeated passages over the field by traditional agricultural machineries (that are always more powerful, heavy and polluting).

These and other results are obtained according to the present invention suggesting a system employing two machineries that can operate as a self-moving cable traction plowing machine, with automatic driving and electric propulsion, that can be quite easily realised and practically realised, and that can be safely and efficiently operated, as well being not expensive.

It is therefore a specific object of the present invention to provide an agricultural cable traction system with electric propulsion, said system comprising two agricultural machineries, respectively one left-handed machinery and one right-handed machinery, working as a couple, said machineries left-handed and right-handed being technically identical, each machinery providing a frame, with four wheels, a driving and reversible control unit, a hoist, provided with a safety clutch, a cable which winds around the hoist, jacks for steadiness, on the working side of the machinery, towards the field to till, and weights for steadiness (i.e. counterweights), means for independent and remote automatic driving, the work as a couple of said machineries left-handed and right-handed being realized by means of said cable having appropriate elasticity and tensile strength features, wherein said cable extends, winding and unwinding during the work, between the respective hoists of the two machineries, on said cable being provided an agricultural tool that moves, at the same time as said cable winds around said hoists, between said left-handed and right-handed machineries, said system being characterised in that there is provided, in correspondence with the coupling of the agricultural tool to said cable, a telescopic arm able to extend the cable during the advancement of the machineries for the positioning thereof in the next work position.

Always according to the invention four driving and steering wheels are provided.

Particularly, said hoist is provided with an engine and batteries, preferably batteries supplied with power provided by a power line connected to an electric cable and/or solar array set on each machinery, and said jacks for steadiness are electric jacks.

Furthermore, according to the invention, on each machinery a tool carrier and reclining work surface, as well as a turret for positioning equipments for the independent and remote automatic driving and/or communication equipments, are provided.

Still according to the invention, the system comprises a quick hook and release system for said working tools.

Particularly, said system can comprise at least one of the following tools:
  single or multi furrow reversible plough,
  reversible harrow with springs, spikes or discs,
  reversible mower,
  two-faced sowing machine with automatic loading,
  two-faced manure spreading machine with automatic loading,
  two-faced spraying bar,
  subsoiler or ripper,
  bidirectional roller, Cambridge type or smooth type,
  harvesting head.

Preferably, said means for independent and remote automatic driving allow implementing an automatic driving system that permits the user to:
  set in a safety mode (with stop) in case of breakdowns or anomalies;
  define the working perimeter and the field tilling modes;
  follow the established way with the two machineries;
  keep the same distance between the two machineries;
  slow down or accelerate the work according to the inputs obtained from optional WSN sensors set on the working tools;
  to make an emergency stop in case of obstacles laying in the way.

Particularly, a perimeter of the field to till is materialized in a boundary that can be revealed by a laser scanner (wire netting, fence, boundary wall, hedge, or posts spaced at the same distance apart, too), so that, by a GIS (Geographical Information System) graphic application on a console, the user locates the field perimeter physically materialized, said means for independent and remote automatic driving verifies the material boundary position, revealed by laser scanner and geo-referenced by GPS, agree to inputs (and maps), in case of anomalies (e.g. the physical boundary is absent or does not agree with maps), the system getting into safe mode, stopping the work and sending an alarm to the console.

According to the invention, said means for independent and remote automatic driving on each machinery comprises:
  systems on the two machineries, comprising a processing unit; a communication unit; a GPS receiver; a laser scanner; a camera (optional); and
  a remote control console comprising a control computer, a graphical user interface and a communication unit.

BRIEF DESCRIPTION OF THE DRAWINGS

The present invention will be now described, for illustrative, but not limitative purposes, according to its preferred embodiments, with particular reference to the figures of the accompanying drawings, wherein.

DETAILED DESCRIPTION OF THE INVENTION

Figure 1:
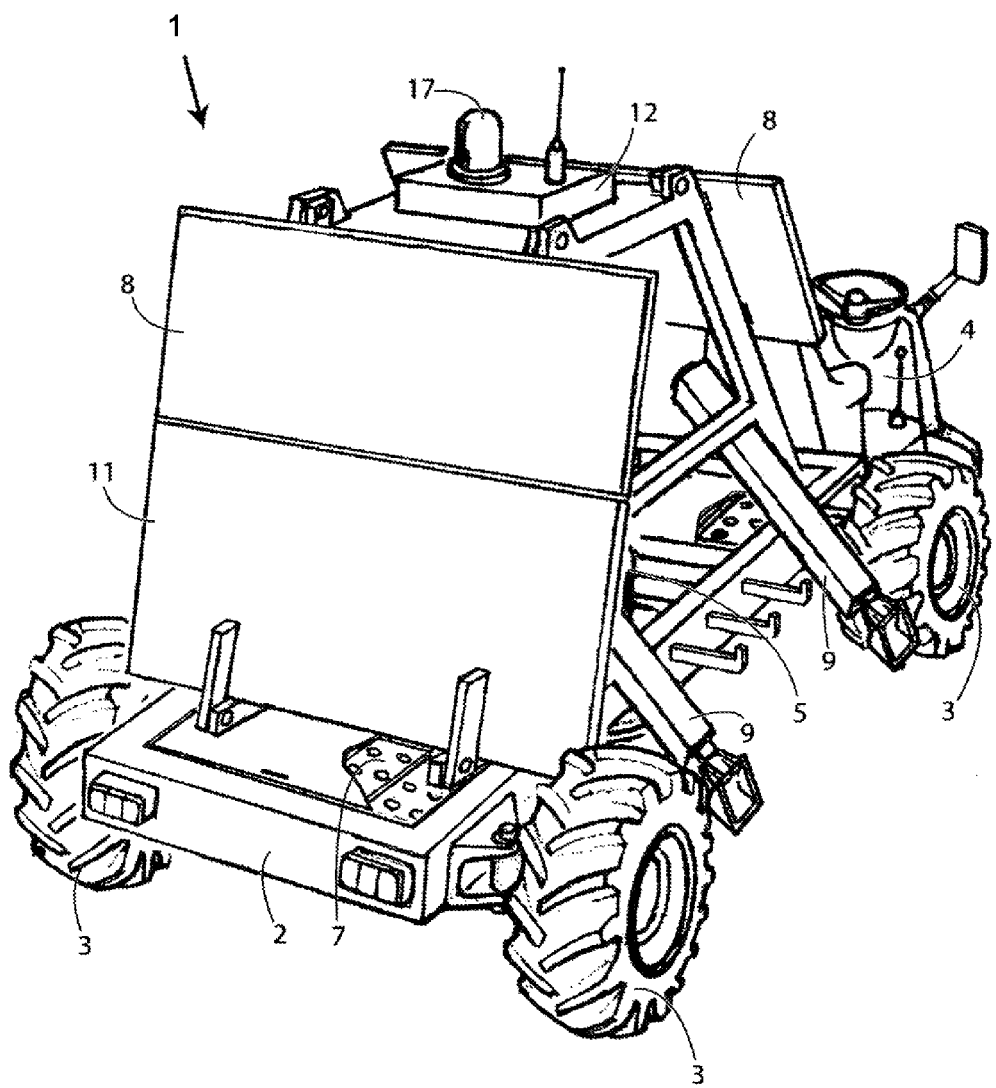
FIG. 1 is a rear perspective view of an embodiment of a (left-handed) machinery of the system according to the invention.
Figure 2:
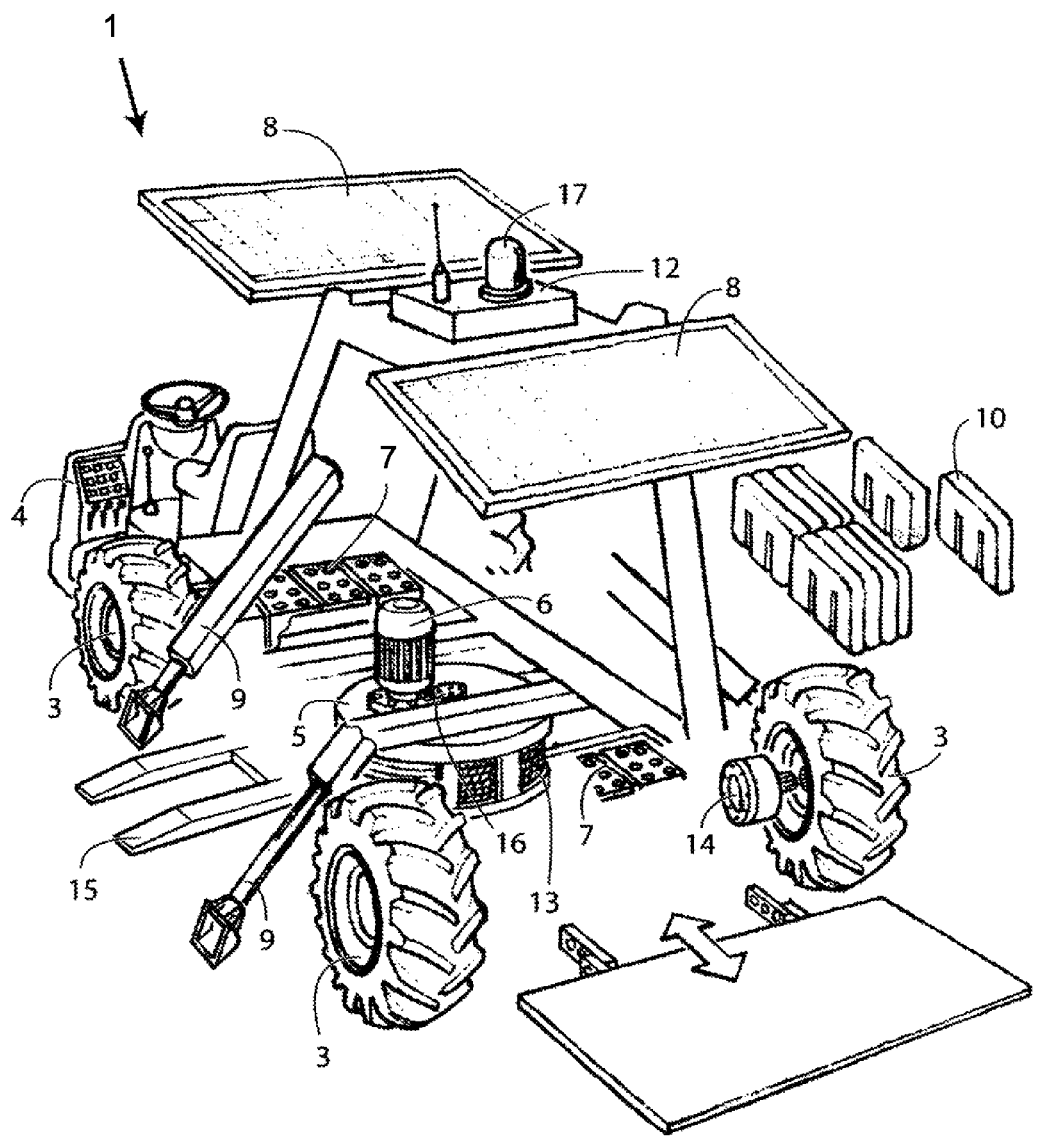
FIG. 2 is an exploded view of a machinery (right-handed) of the system according to the invention.

Referring first to FIGS. 1 and 2 of the enclosed drawings, there is shown a machinery 1 of the system according to the invention. Obviously, it will be necessary for cable traction plowing providing two machineries 1 according to the invention, working coupled to each other. In any case, for the purposes of the present invention, it will be sufficient describing only one of said machineries, since they are perfectly symmetric while operating.

Machinery 1 provides a frame 2, provided with four steering driving wheels 3, and a driving and reversible control unit 4. A hoist 5 is mounted on said frame 2, said hoist 5 being provided with motor 6 and batteries 7, which, in the solution shown in the drawings, are supplied by energy provided by an electrode connected by an electric cable (not shown), and as an auxiliary mode, by solar panels 8, mounted on the machinery 1. The hoist 5 is provided with a safety clutch 16 for preventing breaking of a cable 13.

Each machinery 1 provides stabilization electric jacks 9 (provided on the operation side of the machinery 1, i.e. towards an inside of the field to be worked on), and stabilization weights 10 (i.e. counterweights).

A reclining working surface 11 is provided behind the machinery 1. Above, machinery 1 has a turret 12 for positioning equipments for the independent and remote automatic driving and/or communication equipments.

The solution according to the invention provides an electronic unit (inside the driving unit, and thus not visible in the drawings) controlling the operation of machineries 1 and managing driving, and operative procedures by an autonomous and remote automatic driving, without the driver and based on algorithms using a Parallel Tracking system.

Machinery 1 can also be changed from automatic driving to manual driving, useful for transferring the same from one field to another field.

In order to obtain the above, the driving and reversible control unit 4 is provided.

The electronic unit provides a sophisticated positioning system, which comprises a satellite, radar and laser system, receiving all the information necessary for managing automatic driving under every condition, avoiding obstacles and ground roughness and managing alignment between machineries 1 and advancement along the field.

The electronic unit further comprises a communication system between machineries 1 based on Wi-Fi and optional sensors provided on tools, and Wireless Sensor Networks (WSN) aimed to ensure synchronism between the same and preventing working mistakes.

Figure 3:
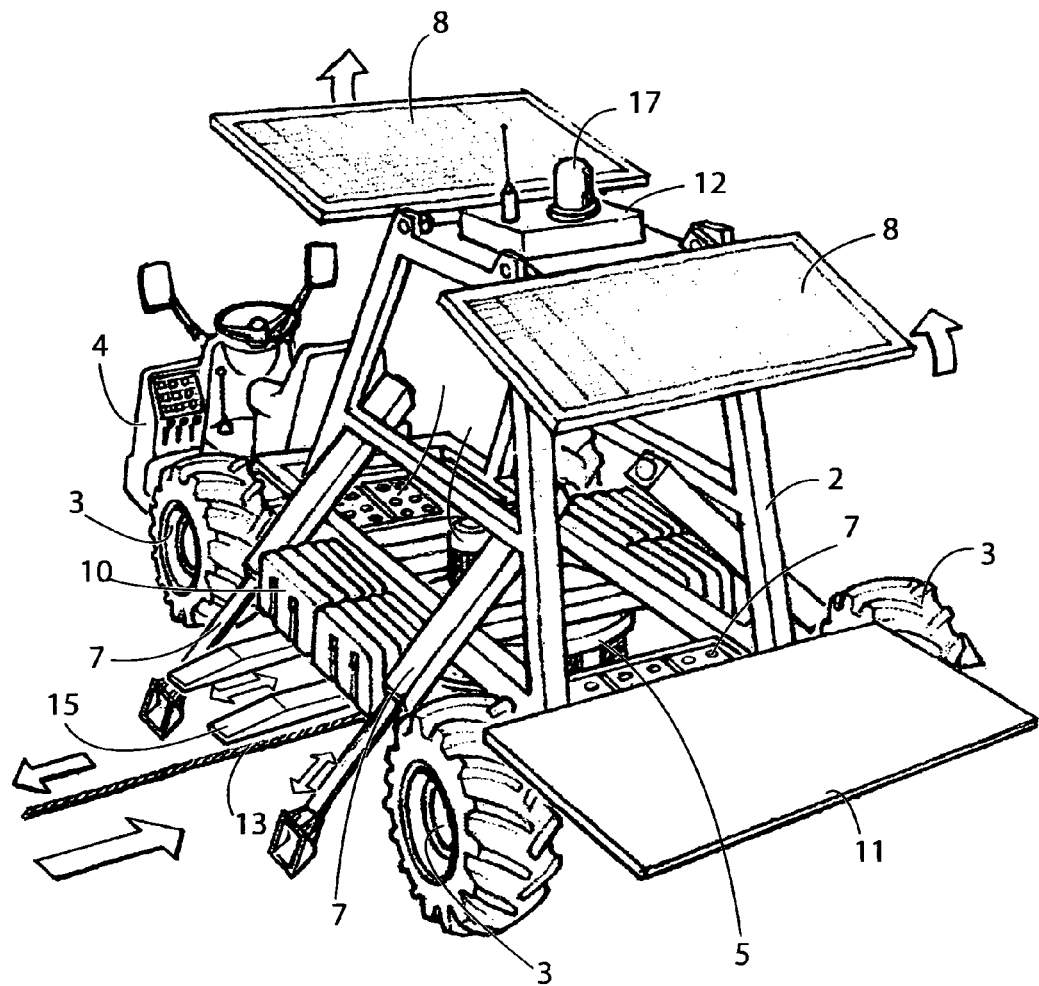
FIG. 3 shows machinery of FIGS. 1 and 2 with a traction rope.
Figure 4:
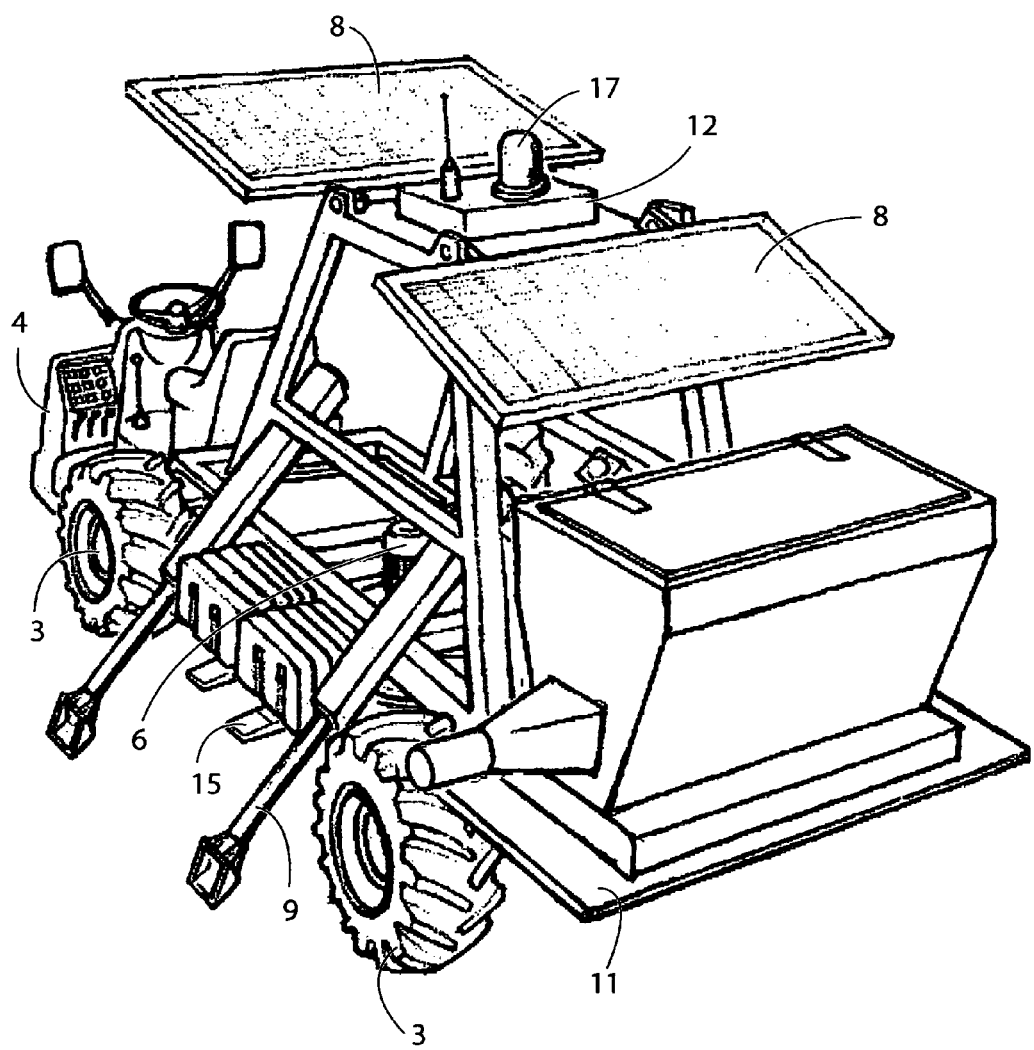
FIG. 4 shows machinery of the system according to the invention with a tool carrier and reclining work surface provided with a seed container.

Observing now also FIG. 3, there is also shown the cable 13, wound and unwind from the hoist 5, and to which a ground working tool (not shown in the figure) couples, some type of tools being shown in FIGS. 5-11.

Figure 5:
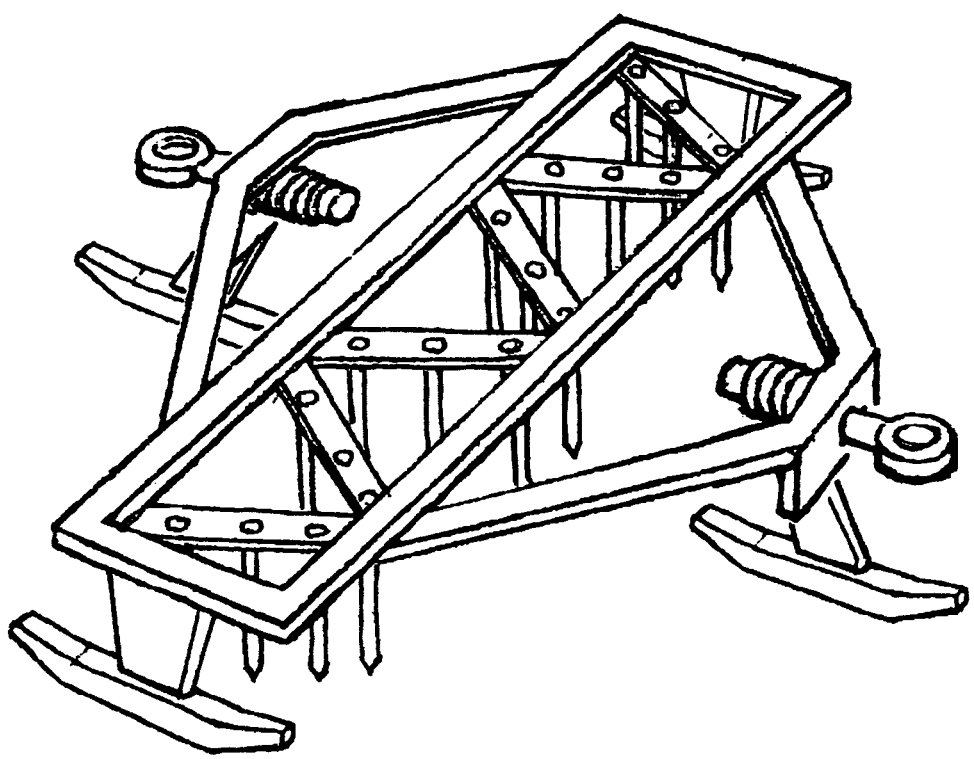
FIG. 5 shows a first tool (harrow with teeth) for machinery of the system according to the invention.
Figure 6:
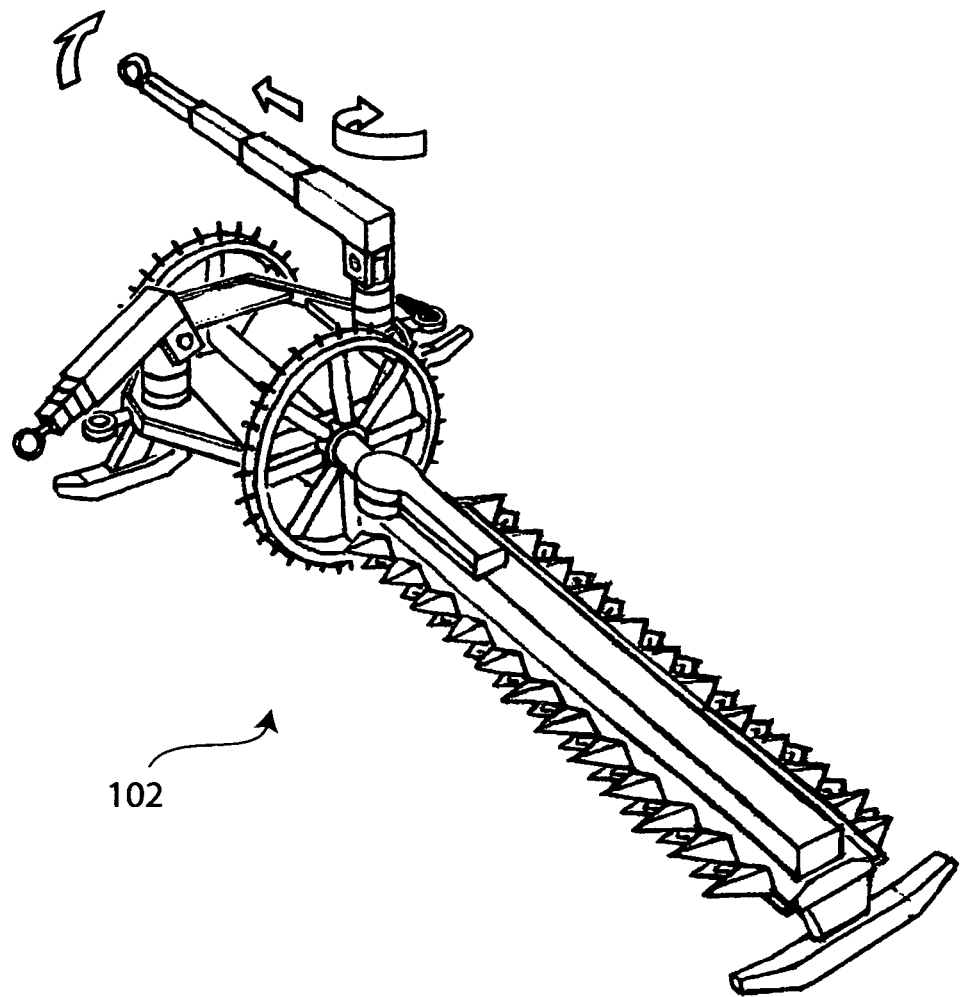
FIG. 6 shows a second tool (harrow with discs or morgano) for machinery of the system according to the invention.
Figure 7:
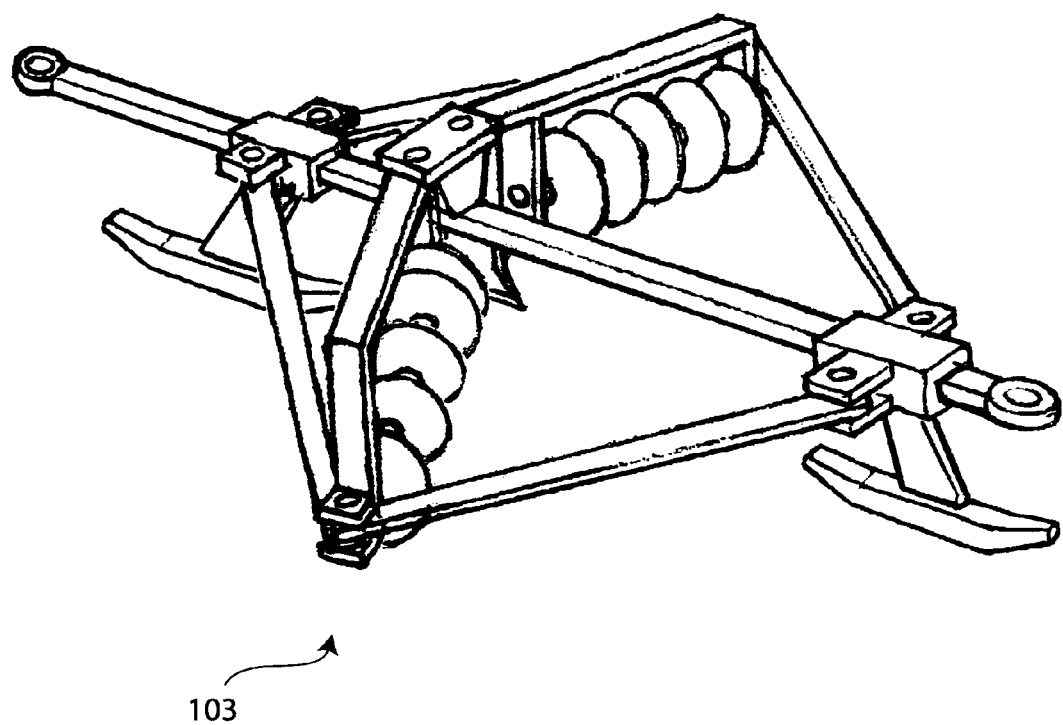
FIG. 7 shows a third tool (mower) for machinery of the system according to the invention.
Figure 8:
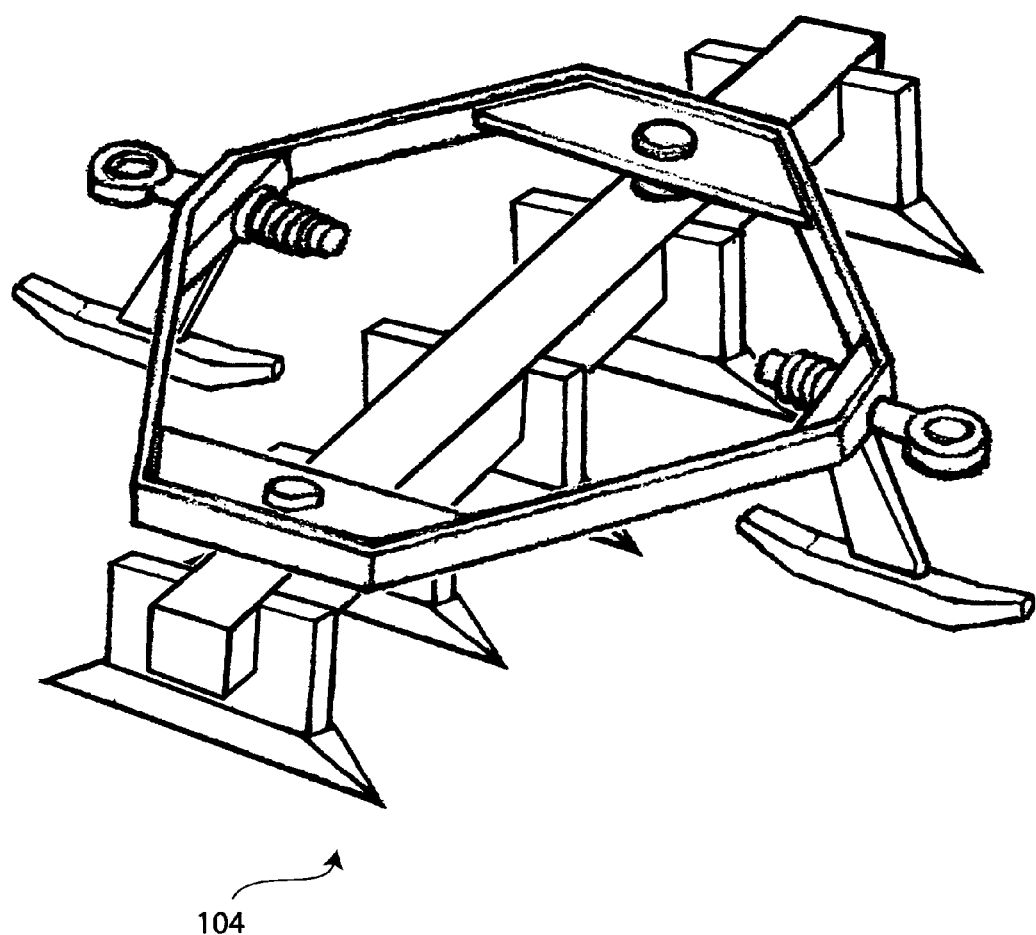
FIG. 8 shows a fourth tool (ripper or subsoiler) for machinery of the system according to the invention.
Figure 9:
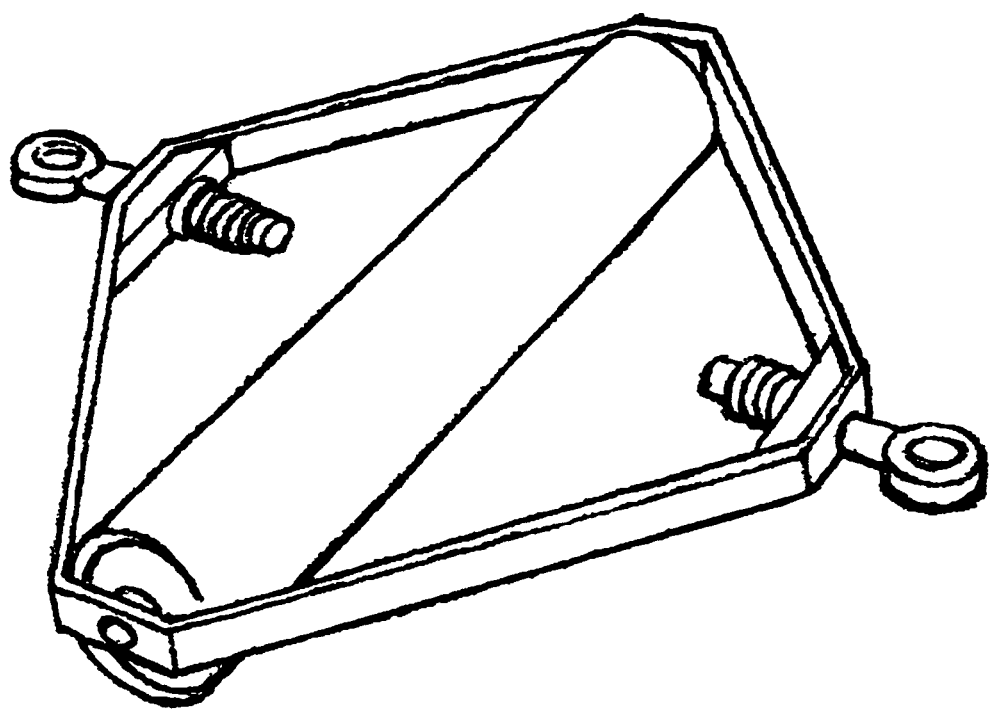
FIG. 9 shows a fifth tool (roll) for machinery of the system according to the invention.
Figure 10:
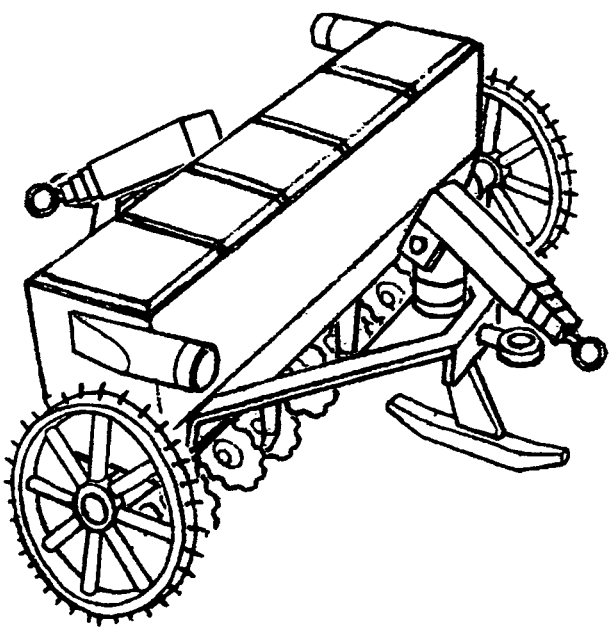
FIG. 10 shows a sixth tool (seeder) for machinery of the system according to the invention.
Figure 11:
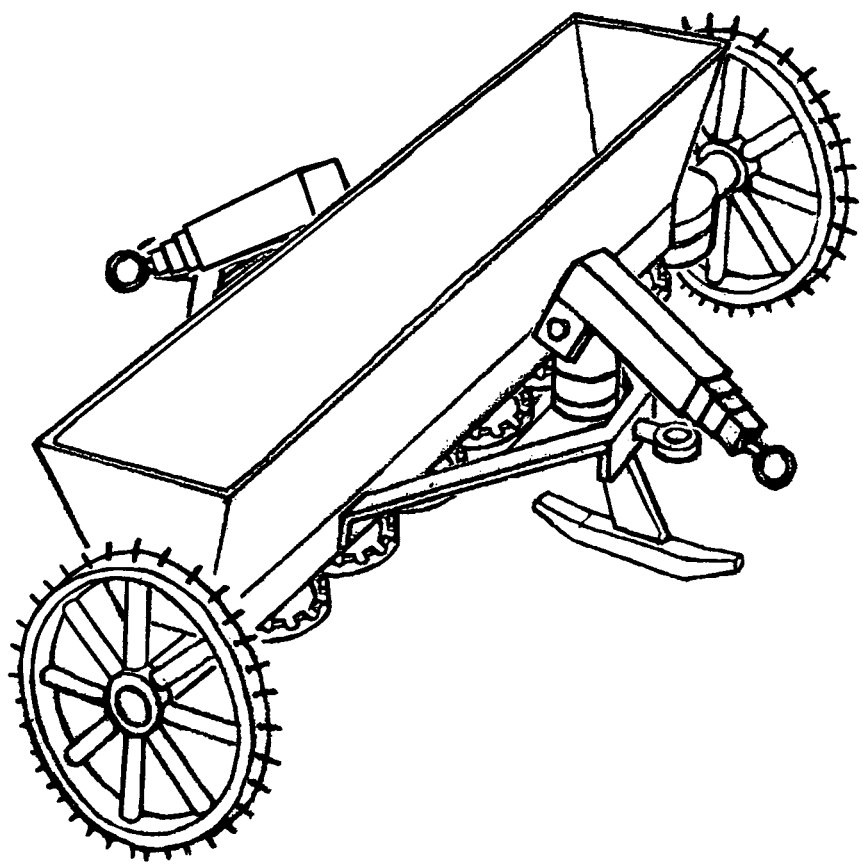
FIG. 11 shows a seventh tool (manure spreader) for machinery of the system according to the invention.
Figure 12:
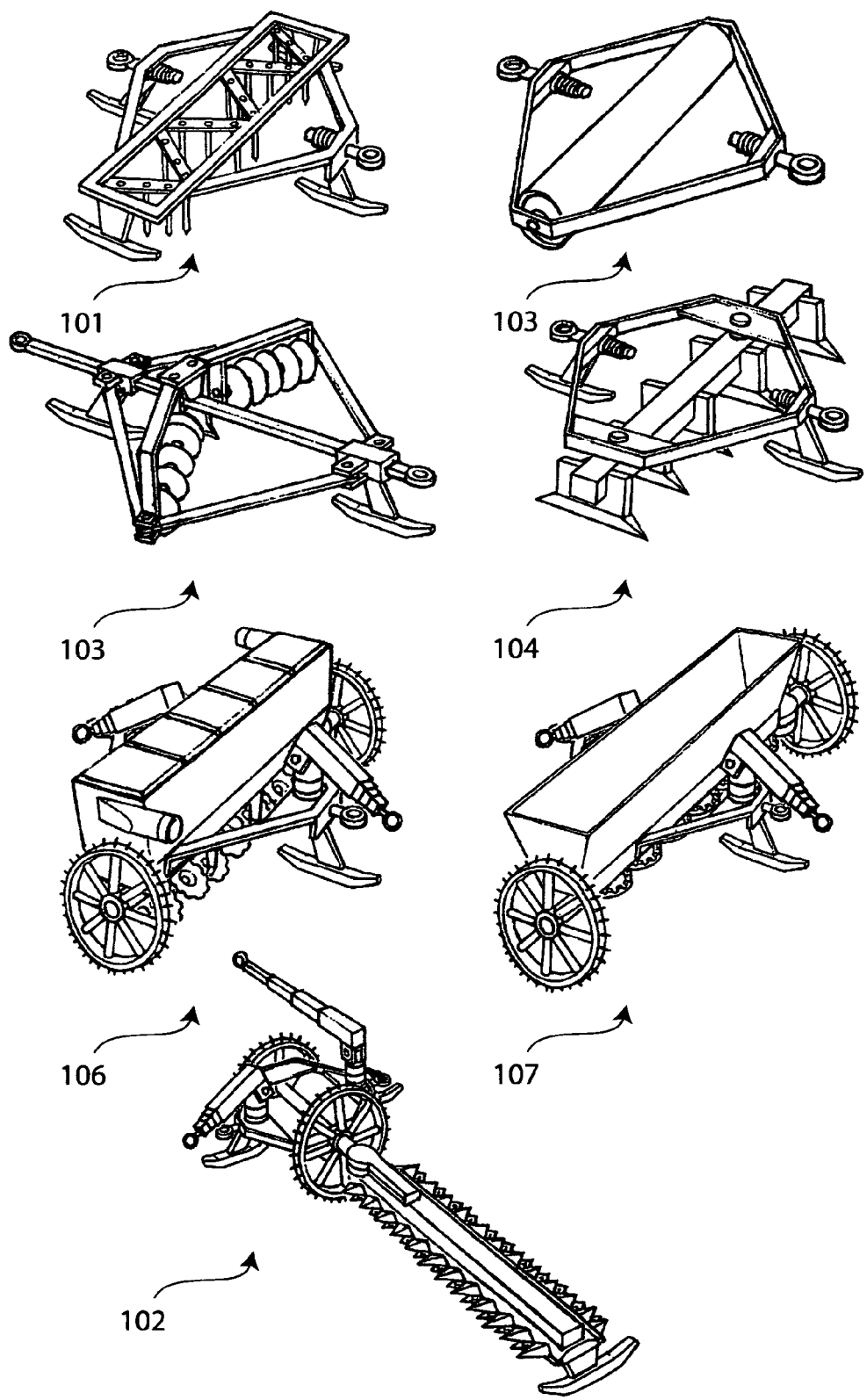
FIG. 12 shows some tools for machinery of the system according to the invention.
Figure 13:
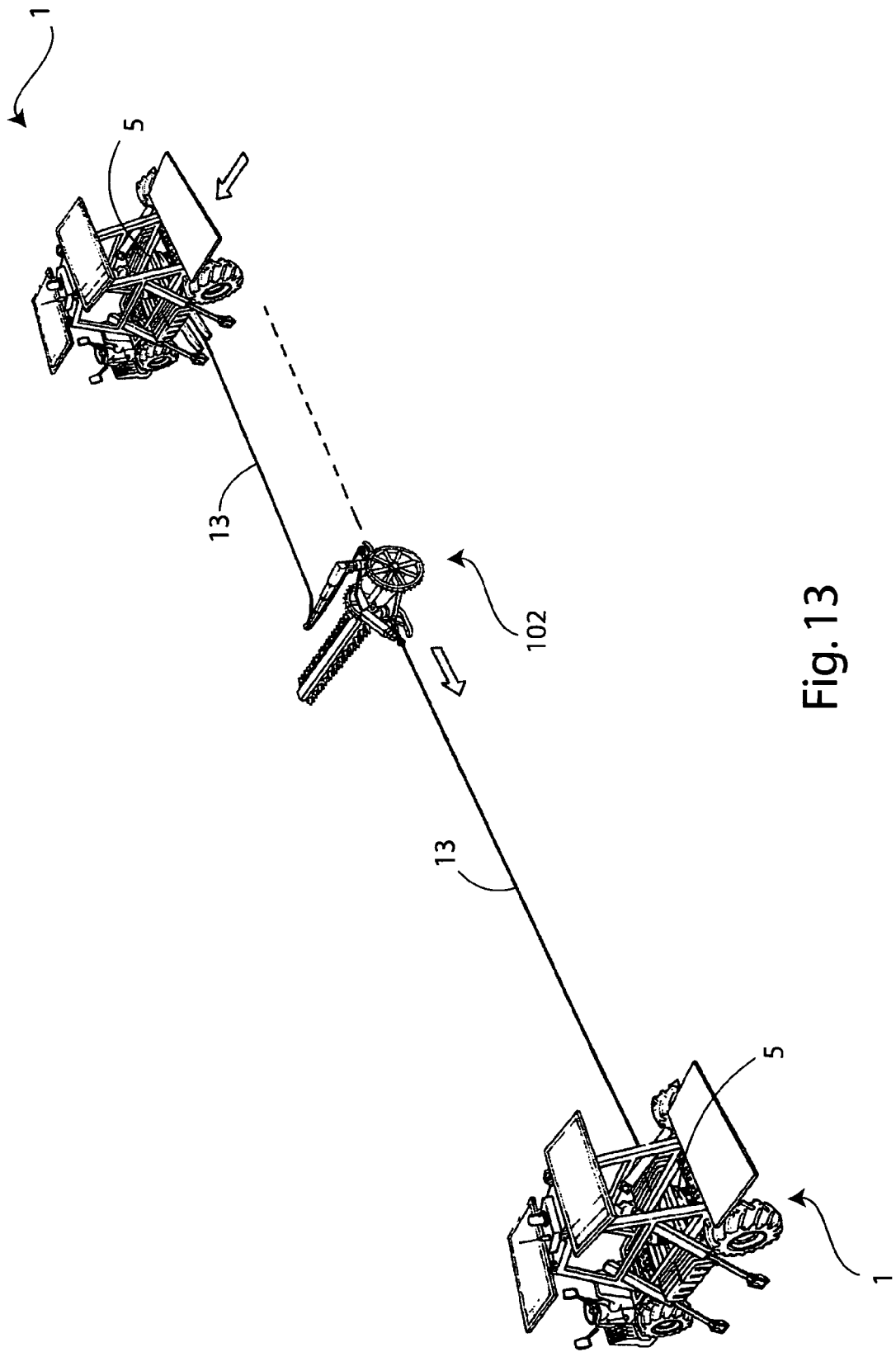
FIGS. 13 and 14 show, respectively, step 1 and step 1-step 2 working of a machinery of the system according to the invention.
Figure 14:
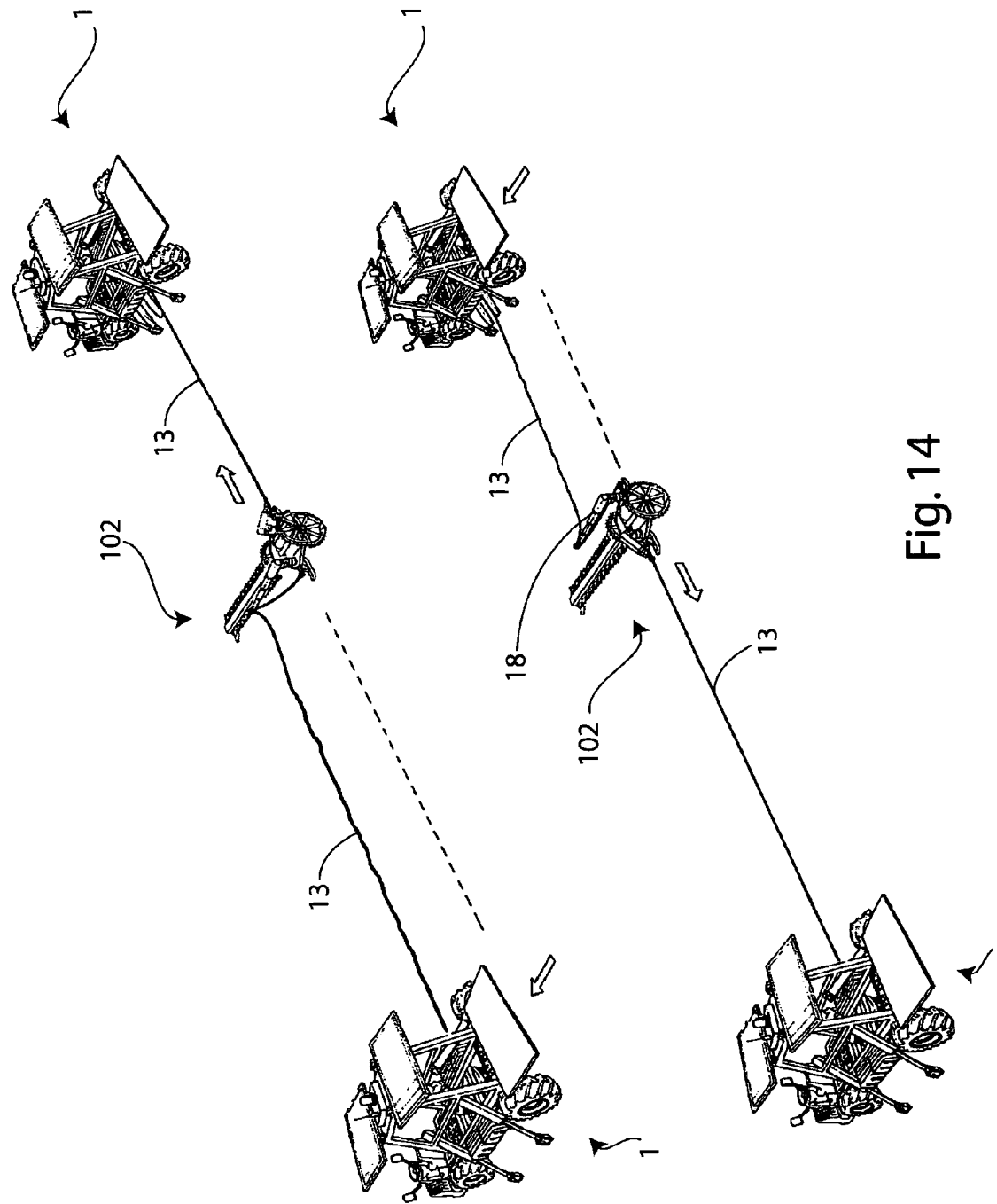
Figure 15:
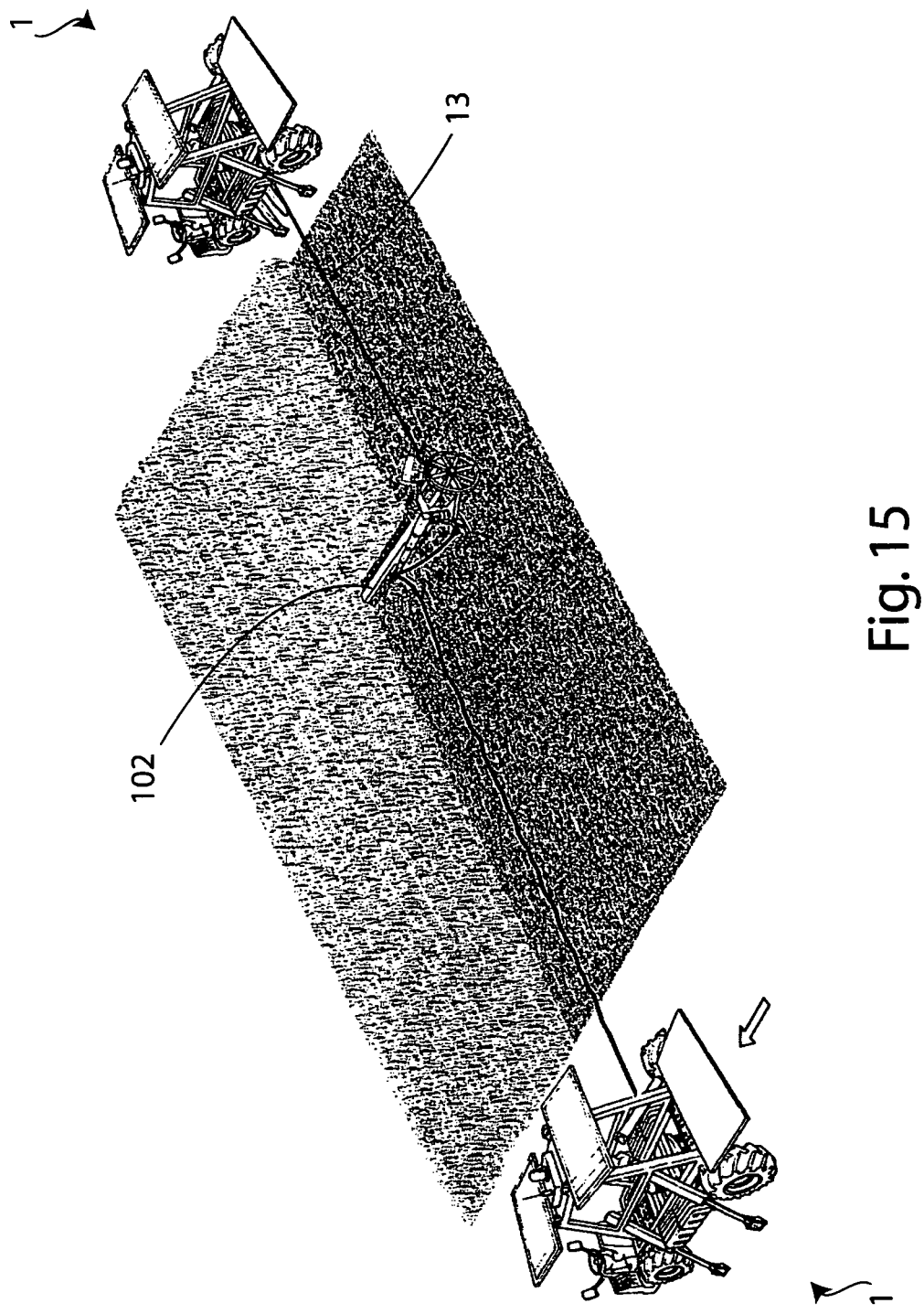
FIG. 15 shows working of mowing machinery of the system according to the invention.
Figure 16:
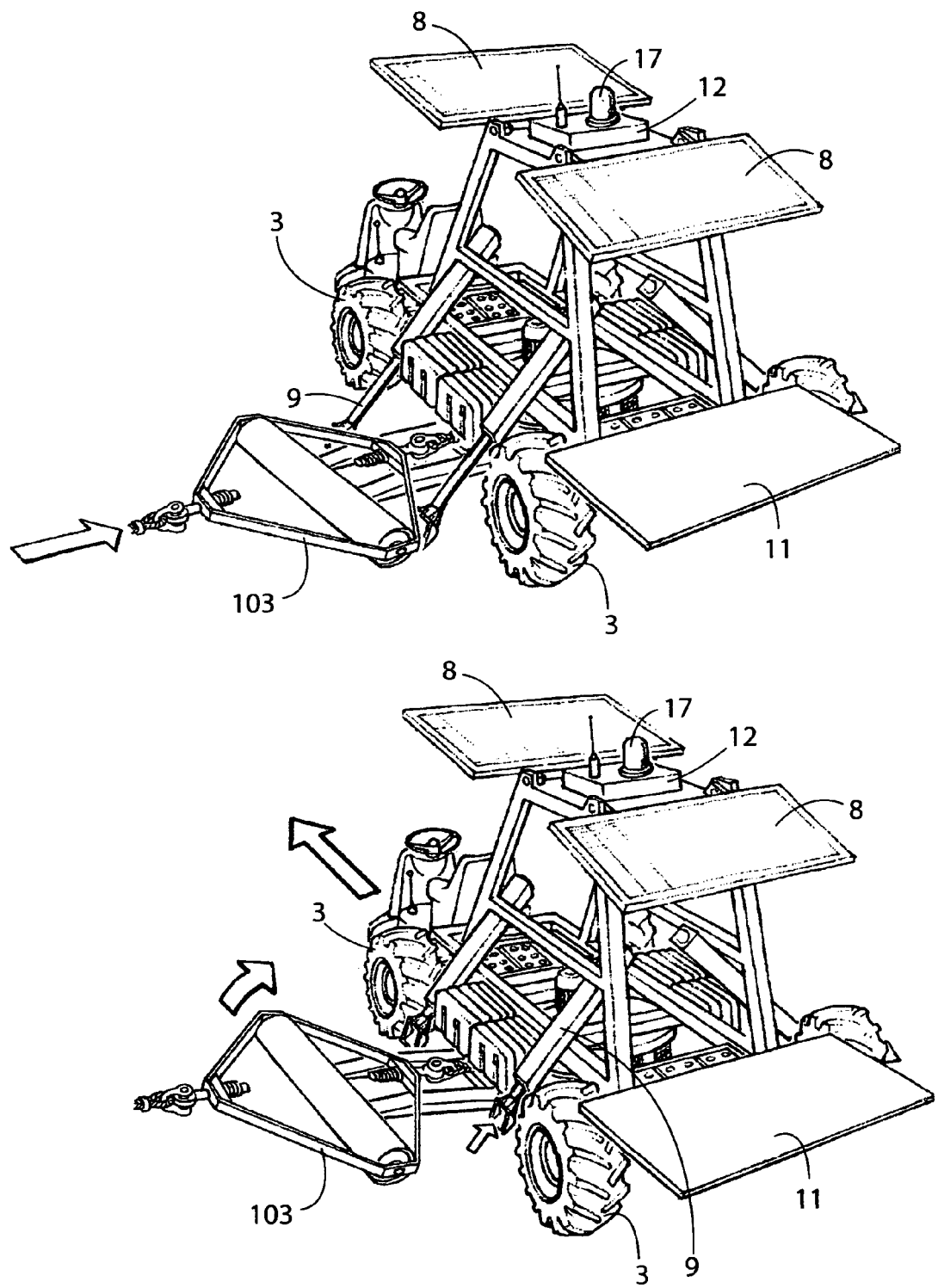
FIG. 16 shows a tool lifting operation for machinery of the system according to the invention.
Figure 17:
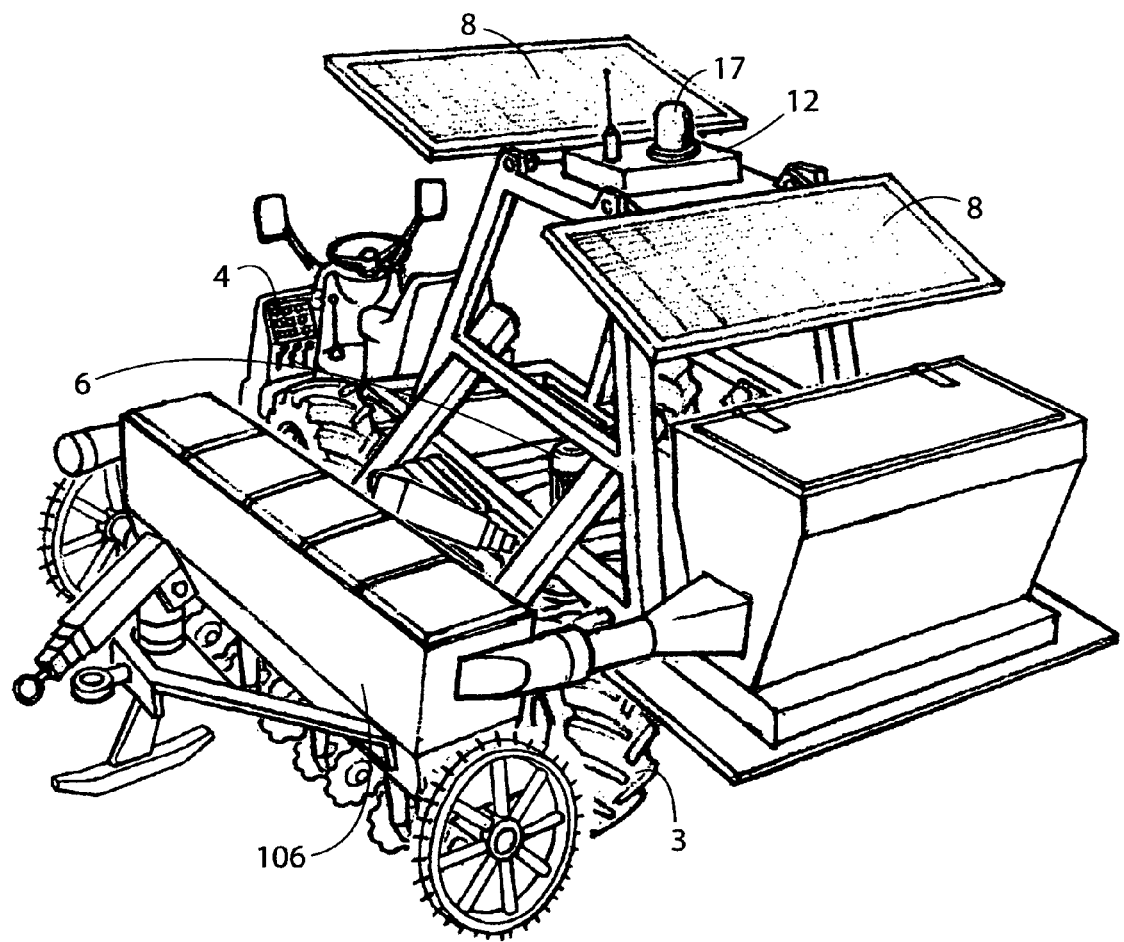
FIG. 17 shows a seed loading operation for machinery of the system according to the invention.

Particularly, FIG. 5 shows a harrow 101 with spikes, FIG. 6 a harrow 102 with discs or a morgano, FIG. 7 a mower 103, FIG. 8 a subsoiler or ripper 104, FIG. 9 a roller 105, FIG. 10 a seeder 106, and FIG. 11 a manure spreading machine 107.

As already said, when using the system according to the invention, two machineries 1 are placed on opposed sides of a field to be subjected to working (respectively one right-handed machinery and one left-handed machinery), each one provided with a hoist 5, on which one or two metallic cables 13 wind, each cable 13 having a length at least equal to the distance between the two machineries 1. Free ends of the cables 13 are fixed to opposite hooks of the working tool (e.g. a harrow 102 with spikes as shown in FIG. 5).

Actuating one of the hoists 5 (active hoist) and leaving the second one in an idle mode (passive hoist), the harrow 102 in FIG. 6 will be moved toward the machinery 1 exerting traction action, thus working the ground (in the present case harrowing) along a direction (according to the arrow) between the two machines 1.

Figure 18:
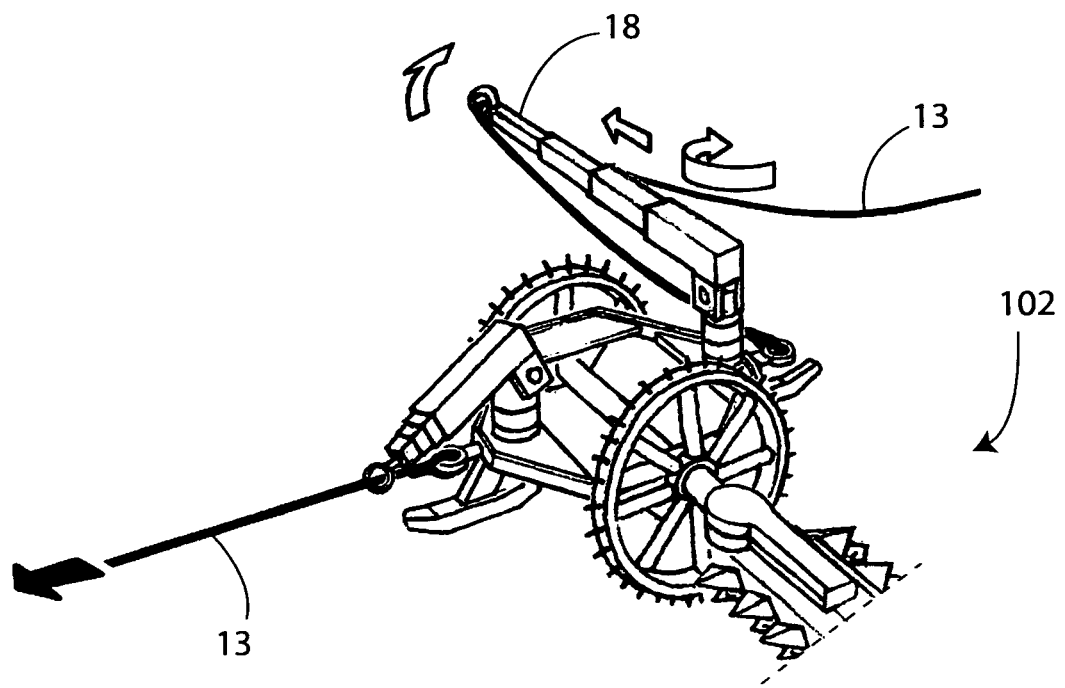
FIG. 18 shows a detail of a cable-laying telescopic arm for machinery of the system according to the invention.
Figure 18A:
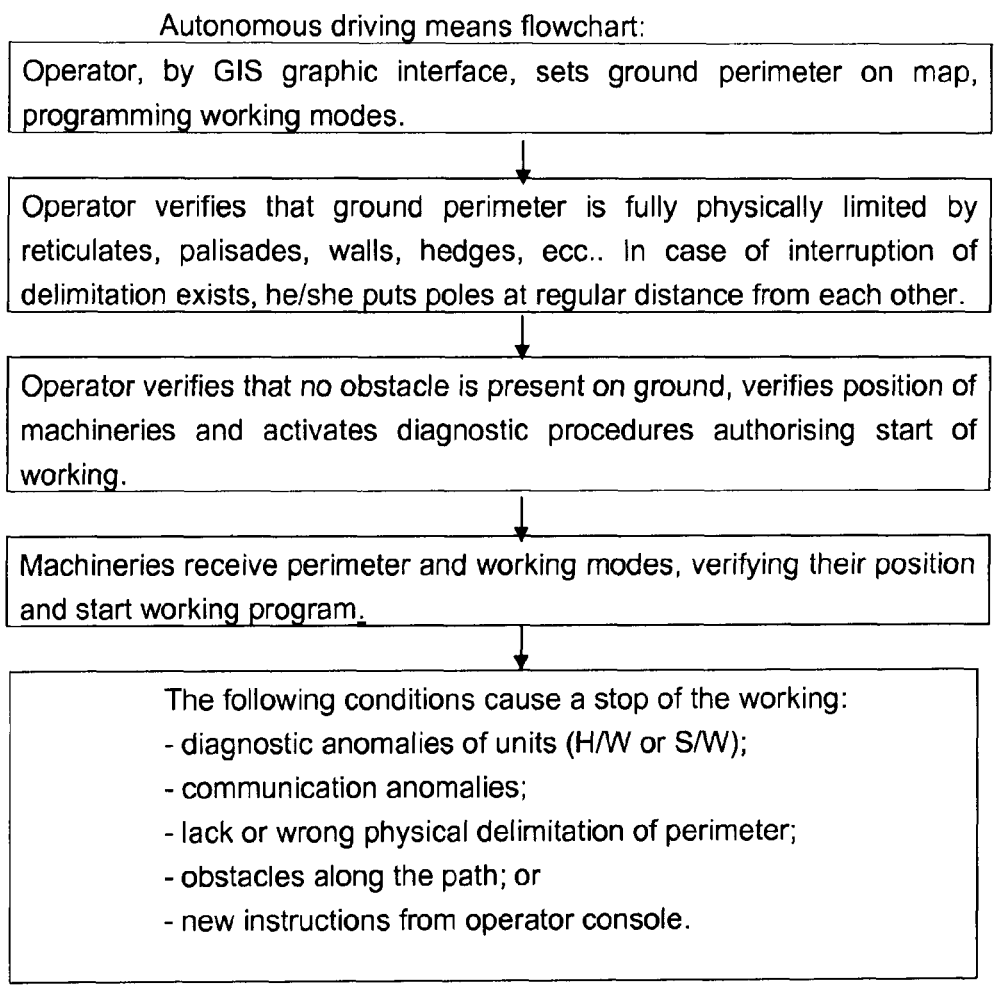

A telescopic arm, shown in FIG. 18, provided on the harrow 102, places the cable 13 directly, according to the next active working position (e.g. seeding and manure spreading), in order to permit working without damaging the same.

Once at the end of its path, the harrow 102 will be, if necessary, inverted by an inversion mechanism setting the same for working in the opposite direction, or it will be used in its bi-directional configuration.

Now, machineries 1 according to the invention, using an electronic positioning system, will move an active length equivalent to the working width (e.g. plowing width) and actuation of the hoists 5 will be inverted: driving (active) machinery 1 will put its hoist 5 in an idle mode (thus becoming passive) and the second one (passive) will actuate its hoist 5 (thus becoming active).

As already said, for every tool advancement direction inversion, machineries 1 will advance along a lateral headland of a distance equal to the working width.

In order to avoid the need for interrupting working, displacements are alternate, i.e. at the beginning of every stroke, advancing only the machinery 1 with the tool moving away and with the idle hoist 5.

Start of displacement occurs through the electronic control system, the algorithms of which simulate a Fowler mechanical system, without using an anchoring point on the ground.

Commutation and displacement speed are essential to prevent cable friction losses and slipping of the same on the ground.

At the end of the working of the whole field, the tool will be released from the cable 13 by pins and the cable 13 is wound again around the hoist 5, thus permitting the machinery 1 to move for subsequent workings.

The supply of electricity to the machineries 1 is ensured by a surface electrode (fully or partially permanent or movable) (not shown) at the headings of the field to be subjected to working.

The best exploitation of the technology suggested is obtained by providing renewable energy sources (e.g. photovoltaic, aeolic or biomass energy), of the farm or close to the farm where the working is carried out.

Machineries 1 alternatively are driving machines, connecting the agricultural tool (harrow 102 with teeth and/or harrow 103 with discs or morgano, seeder 106, ripper 104 or subsoiler, roll 105, manure spreader 107) to the two steel cables 13 operated by the electric hoists 5, that can be of the vertical or horizontal axis drum type.

Motors 14 for the wheels 3, tool lifting slides 15, the safety friction clutch 16 and switching lights 17 are shown in the various figures, e.g. FIG. 2.

Machinery 1 according to the invention can further comprise means for independent and remote automatic driving, comprised of hardware and software elements that, while driving means for ground working, must ensure a high safety level and at the same time permitting an easy programming of paths and a proper cover of the surface to be subjected to working.

Means for independent and remote automatic driving must be able to:
  set a safety mode (stop) in case of failure or anomalies;
  permit the operator to define a working perimeter and ground working modes;
  follow a set path with the two machineries;
  maintain distance between the two machineries;
  slow down or accelerate working on the basis of inputs received from optional WSN sensors provided on the working tools;
  make an emergency stop in case of obstacles along the path.

In order to ensure a safe operation, a perimeter of ground to be subjected to working must be created by a limit that can be detected by laser scanners (reticulate, palisade, wall, hedge or even poles at a regular distance from each other).

By a GIS (Geographical Information System) graphic application on console, an operator individuates on a map the perimeter of the ground.

Means for independent and remote automatic driving verify that the position of the limit detected by a laser scanner, and geo-referenced by GPS, corresponds to instructions (and to the map) received from the operator console. If anomalies are detected (lack of physical limit or no correspondence with the map), the system will enter into a safety mode, interrupting working and sending an alarm to the console.

Means for independent and remote automatic driving on board of each machinery is comprised of:
  on board systems; and
  a remote control console.

Each one of the two machineries is provided with a system comprising:
  processing unit;
  communication unit;
  GPS receiver;
  laser scanner;
  camera (optional).

The console is provided with:
a control computer;
a graphic interface; and
a communication unit.

The processing unit is comprised of a "safety critical" application computer based on a calculation system with two processors connected by a 2oo2 architecture.

According to the 2oo2 paradigm, two processors comprising the processing unit carry out the same functions, comparing intermediate results. In case one of the computers detects a discordance, it would put the processing unit in a safety mode making a controlled transaction in a state involving a stop for anomaly/failure of the whole system and sending an alarm to the console.

Two machineries and the console communicate by a safe protocol using a Wi-Fi physical channel for transporting data. Safe protocol ensures:
- integrity of communication. Corrupted data are rejected and transmitted again;
- identity of different units. Three units (two means and one console) are univocally associated with a cryptographic key making it impossible for both malicious or occasional intrusion of other entities or wrong addressing;
- proper data sequence associating a serial ID and a "time stamp" to every pack.

In case of lack of communication or in the presence of data flow anomalies, the driving system software stops the system.

Each one of the two machineries is provided with a GPS receiver used to define the working path on the ground.

Each one of the two means is provided with a bi-dimensional laser scanner which is used for:
- individuating limits of ground to be subjected to working;
- individuating possible obstacle on the ground; and
- evaluating the position of each other of the two machineries.

Two machineries can be provided with a WSN module communicating with on board optional sensors of working tools and receiving information suitable to modify and/or adapt working parameters to the climate and ground conditions.

Two machineries can be provided with a camera, not for driving purposes, but which can be used to visualise the ground from the operator console.

The console is based on a "Mobile PC" suitable to be used in an open environment (control computer) provided with the graphic interface to define the working program, i.e. limiting machineries along the path (i.e. ground perimeter) and defining the working path and modes.

By using the communication unit, the console can transmit the working program to the machineries, verifying a position of the machineries, carrying out diagnostic activities, and interrupting or modifying the working program.

Those items in the following list are technical-structural particulars of the machineries 1 according to the invention, and they are given only for exemplificative purposes, in order to show how the machineries 1 can be specifically realised according to the invention, but it is to be understood that they cannot be unduly used to limit the scope of the invention.

Particularly, in this exemplificative realisation, there has been used the following:
Zinc-plated steel beam frames 2, with the following pitch: 2.50 m, 3.00 m and 3.50 m—width: 1.50 m, 2.00 m and 2.50 m—track: 2.00 m, 2.50 m and 2.70 m—length: 3.50 m, 4.00 m and 4.50 m, with a fixed ballast support of 1 t.
hoist 5 having a diameter of: 1.80 m, 2.00 m and 2.20 m, exit from right side or left side according to the working program;
electric jacks 9 necessary to oppose the hoist traction force;
tool lifting slides 15, lifting the working tools, provided on the right or left side, on the basis of the working side;
tool-bearing working surface 11, suitable to support working material (e.g. seeds, fertilizers, solid or liquid manures, ecc.)
turret 12 for positioning equipments, for autonomous remote automatic driving and communication apparatuses, receiving transceiving antennas of GPS, Radar and Laser systems; further supports antennas and optional Wi-Fi Communication and Wireless Sensor Networks (WSN) systems;
electronic unit: it processes information received from apparatuses installed on the turret 12 and drives the automatic driving guide (lacking the driver) on the basis of the set working programs; it has a keyboard and a monitor for manual driving (when the driver is on board);
electric motor 6 with three levels of power (40 KW, 60 KW, 100 KW), with power variation transmission for the hoist 5 and cable anti-breaking device of the safety friction clutch 16 and advancement variator type, with four wheel drive;
both axes with iso-diametric steering wheels 3 provided with axial electric motors 14;
wheels 3 with 24", 28" and 30" rims;
steel cable 13 with a diameter of 20 mm, 30 mm or 40 mm, having suitable elasticity and resistance properties;
working tools:
  plowing: mono- or poli-plough reversible plow (not shown);
  harrowing: spring, teeth and/or disc harrow (morgano), that can be adapted to the different kind of ground and agronomic needs, all the tools being reversible tools;
  subsoiler: ripper 104 or subsoiler;
  seeding: reversible and rechargeable reversible seeder 106 and manure spreader 107, with automatic loading of the turnable tool supporting surface of the machinery;
  spraying: reversible sprayer bar, resting on slides (as reversible skis) or on wheels, with nozzle-supporting bars having a variable width supplied by a tool supporting surface by tube winding rolls (not shown);
  rolling: Cambridge type or smooth roller 105 with different width and bi-directional rolling;
  a collection: headings that can be adapted to the different type of products, with or without transportation of the same toward the machinery tool supporting surface.
safety switching lights 17, automatically used when working;
driving control unit 4 and autonomous and remote automatic driving console, with steering wheel, braking (service and parking brakes) and variator control; the control unit 4 also houses auxiliary manual controls such as stabilizers, for the hoist, ecc.
battery pack 7, with high capacity lithium or hydrogen batteries, with automatic charge supply when under tension;
photovoltaic generator or solar panel 8: stand-alone photovoltaic current generator, supplying the battery pack 7 in case of a lack of power supply.

Operation of a system according to the invention provided with GIS will be described in the following.

a. Setting of Working Geographic Perimeter

The GIS graphic interface permits defining the working limit on the map. The system permits defining limits as a trapezium.

During this phase, there is also defined the traction machinery advancement direction.

During this step, software controls some geometric parameters, and particularly that distance which between the two basis (a and b) is sufficient, and that distance which between trapezium sides is sufficient, and then identifies the position to start traction machineries.

Then, the drive and working autonomous control system is programmed, defining geographic limits of the ground to be subjected to working.

Working lines are perpendicular to the advancement direction: traction machineries 1 advance parallel with respect to the trapezium sides, and the operator only has to indicate the working direction.

During working, the geographic limit is always compared with the physical limit detected by telemetric sensors (e.g. a laser scanner).

b. Delimitation of Working Physical Perimeter

During this phase, the operator must verify that the geographic perimeter delimitated during step a corresponds to physical delimitators provided on the ground.

To this end, the operator puts reflecting poles along the geographical working perimeter every 2-5 meters.

The pole positioning operation can be eased by a GPS connected with the same instrument employed to define the geographic limit, thus evidencing the operator position on the ground directly on the graphic interface.

Traction machineries 1 will continuously compare the physical limit and the geographic limit, and every difference will be recorded: a too large of a difference will immediately cause a stoppage of the working program.

c. Working Verifications

Steps a. and b. can be carried out only once, and they are valid for every kind of working carried out on the same ground.

Working verifications must be carried out before every working step.

During this step, the operator must verify that the ground is free from obstacles, the physical limits are safe and in good condition, and that the ground is suitable for working.

Traction machineries 1 are placed as required by the working program processed by the system.

Positioning of the traction machineries 1 is obtained by making the dark triangle (real position of the specific traction machinery) coincide with the clear triangle (set position of the traction machinery start).

If activities are for any reason suspended, traction machineries "start set position" will be the position where activities have been suspended and specific traction machinery must be positioned at the specific point.

d. Start of Working

This phase can be started only when specific traction machinery is positioned in the position set for start.

Second traction machinery is positioned at the distance provided for the type of working and the suitable tool is mounted on the machinery.

Traction machineries verify at the start:
that the on board self-diagnostic gives a positive result;
that the position is correct (i.e. the specific traction machinery must be in the position set at the start and the second traction machinery verifies its position with respect to the first one); and
that the working physical limit is properly juxtaposed to the set geographic limit.

e. Working

Starting conditions:
field observed from a side to b side;
first tractor on the left of the field with its hoist 5 open rightward (i.e. left-hand machinery);
second tractor on the right of the field with its hoist 5 open leftward (i.e. right-hand machinery);
and thus
Step 1) first tractor releases working tool;
Step 2) second tractor puts its hoist 5 in an idle mode, i.e. with minimum tension;
Step 3) second tractor releases and lifts up its own jacks 9;
Step 4) second tractor advances a distance corresponding to a machinery length;
Step 5) second tractor puts its own jacks 9 into the ground to have the highest resistance;
Step 6) second tractor drags tool by its own hoist 5 toward itself;
Step 7) second tractor, after having worked the line, lifts the working tool along the guides;
Step 8) second tractor releases working tool;
Step 9) first tractor puts its hoist 5 in an idle mode, i.e. with minimum tension;
Step 10) first tractor releases and lifts its own jacks 9;
Step 11) first tractor advances a distance corresponding to a machinery length;
Step 12) first tractor puts its own jacks 9 into the ground to have the highest resistance;
Step 13) first tractor drags working tool by its own hoist 5 toward itself;
Step 14) first tractor, after having worked the line, lifts the working tool along the guides.

Before every step, radio visibility and lack of obstacles between machineries are further verified and sensors on the tool are interrogated.

During steps 6) and 13), resistance conditions of the ground are verified during traction and, if necessary, the safety clutch 16 is used.

The present invention has been described for illustrative and not limitative purposes, according to its preferred embodiments, but it is to be understood that variations and/or modifications can be introduced by those skilled in the art without departing from the relevant scope, as defined in the appended claims.

The invention claimed is:
1. Agricultural traction system comprising:
two agricultural machineries, respectively one left-handed machinery and one right-handed machinery, each machinery having:
a rectilinear frame having four corners,
four wheels, each attached to one of the four corners of the rectilinear frame,
a driving and reversible control unit mounted on the frame between two adjacent wheels of the four wheels,
a hoist connected to the frame and provided with a safety clutch,
jacks arranged on one side of the frame and configured to steady the machinery,
counterweights, arranged on another side of the frame, opposite to the side of the frame on which the jacks are arranged, and
means, provided inside the control unit, for independent and remote automatic driving,
a cable configured to wind and unwind around respective hoists of the two machineries,
an agricultural tool that moves along the cable as the cable winds and unwinds around the hoists; and a telescopic arm attached to the agricultural tool and configured to extend the cable during movement of the agricultural tool along the cable.

2. Agricultural traction system according to claim 1, further comprising:
a motor operatively connected to each of the four wheels.

3. Agricultural traction system according to claim 1, further comprising:
a motor and batteries operatively connected to each hoist.

4. Agricultural traction system according to claim 3, further comprising:
a solar panel configured to supply power to the batteries.

5. Agricultural traction system according to claim 1, further comprising:
a reclining work surface provided on the frame.

6. Agricultural traction system according to claim 1, further comprising:
a turret mounted on top of each machinery and configured to position equipment thereon.

7. Agricultural traction system according to claim 1, further comprising:
a quick hook and release system attached to the agricultural tool.

8. Agricultural traction system according to claim 1, wherein the agricultural tool is at least one of the following:
reversible harrow with springs, spikes or discs,
reversible mower,
two-faced sowing machine,
two-faced manure spreading machine,
subsoiler or ripper, or
bidirectional roller.

9. Agricultural traction system according to claim 6, wherein the means for independent and remote automatic driving of each machinery includes an antenna secured to the turret.

* * * * *